United States Patent [19]

Park

[11] Patent Number: 4,725,703

[45] Date of Patent: Feb. 16, 1988

[54] TURN TABLE FOR USE IN A MICROWAVE RANGE

[75] Inventor: Jong D. Park, Kyungsangnam, Rep. of Korea

[73] Assignee: Gold Star Co., Ltd., Seoul, Rep. of Korea

[21] Appl. No.: 935,263

[22] Filed: Nov. 26, 1986

[30] Foreign Application Priority Data

Nov. 27, 1985 [KR] Rep. of Korea ............... 15677/1985

[51] Int. Cl.$^4$ ............................................. H05B 6/78
[52] U.S. Cl. ..................... 219/10.55 F; 219/10.55 E; 219/389; 108/20; 108/141; 99/443 R
[58] Field of Search .................. 219/10.55 F, 10.55 E, 219/10.55 R, 389; 108/20, 139, 141, 144; 126/338; 99/DIG. 14, 443 R

[56] References Cited

U.S. PATENT DOCUMENTS

| | | | |
|---|---|---|---|
| 4,523,070 | 6/1985 | Jorgensen et al. | 219/10.55 F |
| 4,591,682 | 7/1984 | Takeuji | 219/10.55 F |
| 4,631,379 | 12/1986 | Aoyama | 219/10.55 F |

FOREIGN PATENT DOCUMENTS 223956 11/1968 U.S.S.R. .................. 219/10.55 F

*Primary Examiner*—Philip H. Leung
*Attorney, Agent, or Firm*—Birch, Stewart, Kolasch & Birch

[57] ABSTRACT

A turntable for use in a microwave oven which comprises a first rotatable axle secured to the plate of the turntable and disposed within an annular holder, the first rotatable axle including a cavity disposed along its center, an actuating gear having a shaft extended therefrom for being actuated to engage the cavity of the rotatable axle, the actuating gear including an aperture disposed along its center for receiving a second axle supported on a lower plate of a housing member and an annular cam disposed at the underside thereof, the annular cam having an inclined surface disposed along its periphery, a supporting roller secured to the lower plate of the housing member for slidably contact with the declined surface of the annular cam for moving the actuating gear upwardly and downwardly, and a main driving gear actuated by a motor, the main driving gear geared with the actuating gears for rotating horizontally and simultaneously vertically so that the turntable rotates and moves vertically.

4 Claims, 7 Drawing Figures

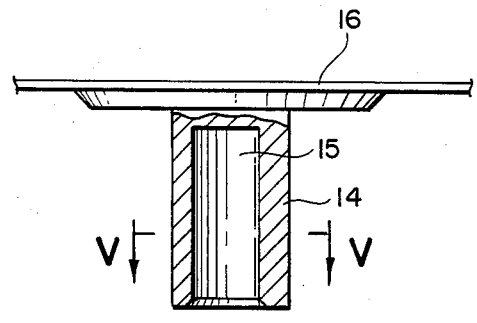
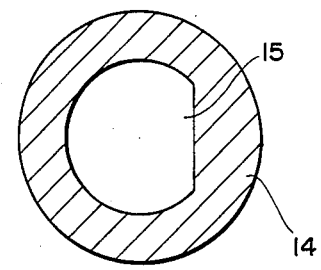
FIG. 4  FIG. 5
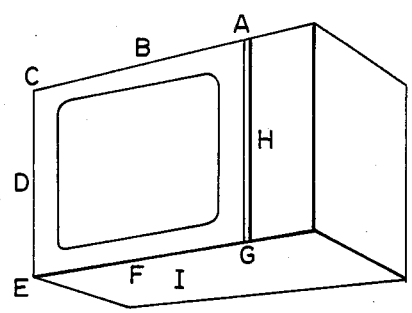
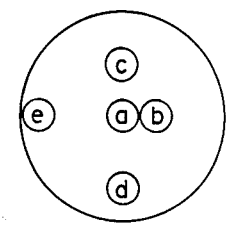
FIG. 6  FIG. 7

TURN TABLE FOR USE IN A MICROWAVE RANGE

BACKGROUND OF THE INVENTION

The present invention relates to a turn table for use in a microwave oven and more particularly, to an improved turntable capable of being moved upwardly and downwardly during its rotation.

Conventional microwave ovens are of the type in which the turntable is simply rotated so that a food to be cooked cannot be uniformly heated.

SUMMARY OF THE INVENTION

It is therefore an object of the present invention to provide a turntable for use in a microwave oven not only to be rotated but also to be moved upwardly and downwardly so that a food to be cooked can be uniformly heated.

Accordingly, the present invention comprises an activating gear having a shaft which is mounted to a rotatable axle of a turntable and is provided with a hole adapted to engage an axle fixed on a lower plate of a housing. An annular cam is disposed below the activating gear which includes an inclined surface at its periphery, a supporting roller is provided on the lower plate and adapted to contact the inclined surface of the annular cam, and a main driving gear provided interlocked to the activating gear for rotating and upwardly and downwardly moving the table.

BRIEF DESCRIPTION OF THE DRAWINGS

The above and other related objects and features of the invention will be apparent from a reading of the following description of the disclosure found in the accompanying drawings and novelty thereof pointed out in the appended, and wherein;

FIG. 4 is a cross-sectional view of a rotatable axle of the present invention,

FIG. 5 is an enlarged cross-sectional view, taken along line V—V of FIG. 4,

FIG. 6 is a perspective view of a microwave oven in which various positions to be tested for a leakage of microwave energy are indicated as A, B, C, ... I, and FIG. 7 illustrates that the samples are positioned in place pursuant to an I. E. C. method to effect a test for microwave energy even distribution.

DETAILED DESCRIPTION OF THE INVENTION

Figure 1:
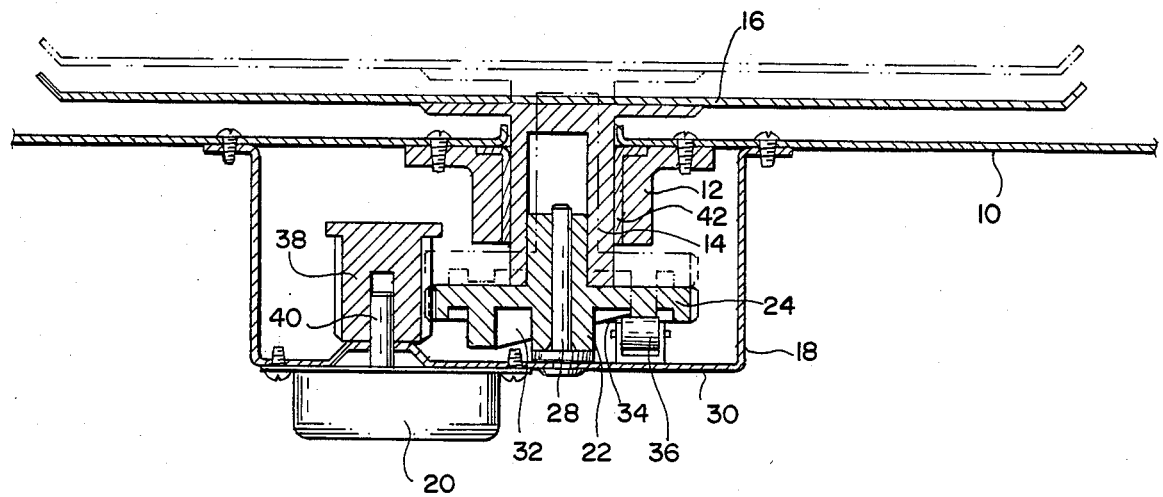
FIG. 1 is a sectional view of the turntable of the present invention.
Figure 2:
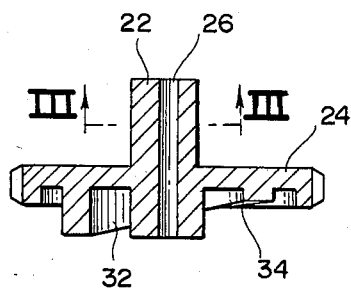
FIG. 2 is a sectional view of an activating gear of the present invention.

Referring to FIG. 1, there is shown a preferred embodiment of the invention. A bottom plate 10 is provided with an annular holder 12 which is adapted to be mounted to a rotatable axle 14 of a turntable 16. A bushing 42 is disposed between the annular holder 12 and rotatable axle 14. A housing 18 fixed to the bottom plate 10 has a driving motor 20 attached thereto for driving a turntable 16. The rotatable axle 14 is provided with a cavity 15 disposed along its center line and is connected to a shaft 22 of an activating gear 24 (FIG. 5). The activating gear 24 includes a hole 26 (FIG. 2) along its center line and is accepted to receive an axle 28 is fixed on a lower plate 30 of the housing 18 (FIG. 2). The activating gear 24 is provided with an annular cam 32 having an inclined surface 34 disposed along its periphery. A supporting roller 36 is installed on a lower plate 30 of the housing 18 to gear with the inclined surface 34 of the annular cam 32. A main driving gear 38 adapted to interlock with the activating gear 24 is mounted to a driving axle 40 of the driving motor 20.

Figure 3:
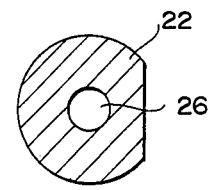
FIG. 3 is a cross-sectional view taken along line III—III of FIG. 2.

Referring to FIG. 2, there is shown a preferred embodiment of the activating gear 24. The shaft 22 of the activating gear 24 is mounted into the cavity 15 of the axis 14 (FIG. 4). Both the cavity 15 and the shaft 22 have a waning moon shaped configuration as shown in FIGS. 3 and 5. Therefore, the rotatable axle 14 of the turntable 16 rotates with the shaft 22 of the activating gear 24.

In operation, when the motor 20 is operated, the main driving gear 38 rotates to gear with the activating gear 24. The supporting roller 36 supports the activating gear 24 along its inclined surface 34 during the rotation of the activating gear 24 so that the activating gear 24 moves upwardly and downwardly. Therefore, the turntable 16 moves upwardly and downwardly since the shaft 22 is mounted to the activating gear 24.

FIG. 6 illustrates a microwave oven in which various characters corresponding to leakage testing positions are indicated as A, B, C, ... I. Wherein "I" indicates the position in the vicinity of the turntable in the bottom of microwave oven. To determine leakages on various positions according to the various distances of axis movement, two microwave oven optionally selected are sampled and tested upon loaded condition of 275 cc and unloaded condition. The results are reported in the following Table 1.

TABLE 1

| Axial Movement | Load/ Unload | Sample Range | Leakage on Each Test Position (mw/cm²) | | | | | | | | |
|---|---|---|---|---|---|---|---|---|---|---|---|
| | | | A | B | C | D | E | F | G | H | I |
| λ/32 | Load of 275 cc | #1 | 1.3 | 1.4 | 0.9 | 0.5 | 1.0 | 1.1 | 1.3 | 0.7 | 1.3 |
| | | #2 | 1.4 | 1.3 | 1 | 0.7 | 0.9 | 1.2 | 1.5 | 0.9 | 1.2 |
| | Unload | #1 | 1.5 | 1.3 | 1.1 | 0.7 | 1.3 | 1.2 | 1.4 | 1.1 | 0.9 |
| | | #2 | 1.3 | 1.2 | 1.3 | 0.9 | 1 | 1.3 | 1.6 | 1.1 | 1.4 |
| λ/16 | Load of 275 cc | #1 | 1.2 | 1.1 | 0.9 | 0.9 | 0.8 | 0.7 | 0.9 | 1 | 1.2 |
| | | #2 | 1.1 | 1.2 | 1 | 0.7 | 0.6 | 0.5 | 0.8 | 0.9 | 0.7 |
| | Unload | #1 | 1.1 | 1.3 | 1.1 | 1.2 | 1.3 | 1.4 | 1.1 | 0.9 | 1.3 |
| | | #2 | 1.2 | 1.7 | 1.3 | 1.4 | 0.7 | 1.1 | 0.9 | 1.3 | 0.8 |
| λ/8 | Load of 275 cc | #1 | 0.01 | 0.009 | 0.01 | 0.008 | 0.007 | 0.009 | 0.008 | 0.01 | 0.01 |
| | | #2 | 0.009 | 0.009 | 0.01 | 0.01 | 0.008 | 0.007 | 0.008 | 0.01 | 0.01 |
| | Unload | #1 | 0.01 | 0.01 | 0.02 | 0.01 | 0.009 | 0.008 | 0.009 | 0.01 | 0.01 |
| | | #2 | 0.009 | 0.01 | 0.009 | 0.01 | 0.008 | 0.009 | 0.01 | 0.01 | 0.01 |
| λ/4 | Load of 275 cc | #1 | 0.009 | 0.008 | 0.02 | 0.008 | 0.01 | 0.009 | 0.01 | 0.008 | 0.01 |
| | | #2 | 0.01 | 0.01 | 0.009 | 0.009 | 0.02 | 0.008 | 0.01 | 0.01 | 0.01 |

TABLE 1-continued

| Axial Movement | Load/ Unload | Sample Range | Leakage on Each Test Position (mw/cm²) | | | | | | | | |
|---|---|---|---|---|---|---|---|---|---|---|---|
| | | | A | B | C | D | E | F | G | H | I |
| | Unload | #1 | 0.01 | 0.02 | 0.009 | 0.01 | 0.01 | 0.02 | 0.01 | 0.01 | 0.01 |
| | | #2 | 0.02 | 0.01 | 0.01 | 0.009 | 0.01 | 0.01 | 0.009 | 0.02 | 0.01 |
| λ/2 | Load of 275 cc | #1 | 1.2 | 0.8 | 0.7 | 1.3 | 1.4 | 1.6 | 1.1 | 0.9 | 0.9 |
| | | #2 | 1.2 | 0.7 | 0.8 | 0.9 | 1.0 | 1.3 | 1.2 | 1.1 | 1.1 |
| | Unload | #1 | 1.3 | 1.1 | 1.2 | 1.3 | 1.1 | 1.3 | 1.2 | 1.1 | 1.1 |
| | | #2 | 1.0 | 1.1 | 1.0 | 1.3 | 1.4 | 1.1 | 1.1 | 1.2 | 1.3 |

(wherein, λ designates a wave length of microwave)

Further, to determine a uniform heating upon various conditions of the axial movement of the turntable, a test is performed by an I. E. C. (International Electrotechnical Committee) method as shown in FIG. 7 wherein "a" resides at the center of tray, "b" contacts "a" at its right side, "c" resides at the position of r/3+28 mm from the center (r: radius of tray), "d" resides at the position of 2r/3 from the center, and "e" resides at the peripheral portion of tray. The results in the temperature variations of the samples in place after heating for a predetermined time, preferably for 71 seconds, are given in the following Table 2.

TABLE 2

| Axial Move- ment | Temperature Variations on Various Positions (°C.) | | | | | | | | | | | | | | | Deviation Rate (%) |
|---|---|---|---|---|---|---|---|---|---|---|---|---|---|---|---|---|
| | a | | | b | | | c | | | d | | | e | | | $\Delta T_{max} - \Delta T_{min}$ |
| | $T_1$ | $T_2$ | $\Delta T$ | $T_1$ | $T_2$ | $\Delta T$ | $T_1$ | $T_2$ | $\Delta T$ | $T_1$ | $T_2$ | $\Delta T$ | $T_1$ | $T_2$ | $\Delta T$ | $\Delta T_a + \Delta T_b + \ldots + \Delta T_e / 5$ |
| λ/32 | 20.5 | 42.7 | 22.2 | 20.3 | 37 | 16.7 | 20.5 | 42.5 | 22 | 20.4 | 43.1 | 22.7 | 20.4 | 44.7 | 24.3 | 35% |
| | 20.4 | 41.8 | 21.4 | 20.5 | 38 | 17.5 | 20.5 | 41.3 | 20.8 | 20.5 | 44.3 | 23.8 | 20.6 | 45.7 | 25.1 | 36% |
| λ/16 | 20.5 | 42.3 | 21.8 | 20.5 | 37.1 | 16.6 | 20.5 | 42.4 | 21.9 | 20.4 | 41.9 | 21.5 | 20.6 | 44.5 | 23.9 | 34% |
| | 20.5 | 43 | 22.5 | 20.4 | 38.3 | 17.9 | 20.4 | 43 | 22.6 | 20.3 | 42.3 | 22 | 20.5 | 45.1 | 24.6 | 30% |
| λ/8 | 20.5 | 42.7 | 22.2 | 20.4 | 43 | 22.6 | 20.4 | 40.7 | 20.3 | 20.4 | 42.1 | 21.7 | 20.5 | 42.5 | 22 | 10% |
| | 20.5 | 43.8 | 22.3 | 20.5 | 42.9 | 22.4 | 20.5 | 41.3 | 20.8 | 20.6 | 40.5 | 19.9 | 20.6 | 43.1 | 22.5 | 12% |
| λ/4 | 20.3 | 40.3 | 20 | 20.4 | 43.2 | 22.8 | 20.4 | 40.3 | 19.9 | 20.5 | 41.5 | 21 | 20.6 | 42.7 | 22.1 | 13% |
| | 20.4 | 43 | 22.6 | 20.5 | 41.7 | 21.2 | 20.5 | 40.7 | 20.2 | 20.6 | 40.8 | 20.2 | 20.6 | 42.5 | 21.9 | 11% |
| λ/2 | 20.3 | 41.3 | 21 | 20.7 | 37.1 | 16.4 | 20.4 | 43 | 22.6 | 20.6 | 43 | 22.4 | 20.6 | 44.8 | 24.2 | 37% |
| | 20.4 | 42.3 | 21.9 | 20.4 | 38 | 17.6 | 20.4 | 42.8 | 22.4 | 20.5 | 42.8 | 22.3 | 20.5 | 46.2 | 25.7 | 38% |

(Wherein, λ is a wave length of microwave, $T_1$ is a temperature before heating, $T_2$ is a temperature after heating, and $\Delta t$ is a variation of temperature)

The results in the above Tables 1 and 2 show that the leakage of the microwave energy is in the minimum in the range of λ/8 to λ/4 and the even heating of food is maximized in the same range.

As set forth hereinbefore, since the turntable according to the present invention moves upwardly and downwardly while rotating, a food to be cooked on the turntable is heated uniformly for saving of cooking time and reduction of electric power.

Having described out invention as related to the embodiment shown in the accompanying drawings, it is my intention that the invention be not limited by any of the details of description, unless otherwise specified, but rather be construed broadly within its spirit and scope as set out in the accompanying claim.

What is claimed is:

1. A turntable for use in a microwave oven which comprises:
    a plate for supporting an object to be heated
    a first rotatable axle secured to the plate and disposed within an annular holder, said first rotatable axle including a cavity disposed along its center,
    an actuating gear having a shaft extended therefrom for being actuated to engage said cavity of said first rotatable axle, said actuating gear including an aperture disposed along its center for receiving a second rotatable axle supported on a lower plate of a housing member and an annular cam disposed at the underside thereof, said annular cam having an inclined surface disposed along its periphery,
    a supporting roller secured to the lower plate of the housing member for slidably contacting with said declined surface of the annular cam for moving the actuating gear upwardly and downwardly, and
    a main driving gear actuated by a motor, said main driving gear geared with said actuating gears for rotating horizontally and simultaneously vertically so that the turntable rotates and moves vertically.

2. The turntable of claim 1 wherein the cavity has a warning moon shaped configuration.

3. The turntable of claim 1 wherein the shaft has a waning moon shaped configuration for corresponding to the cavity.

4. The turntable of claim 1 wherein a range of vertical movement of the turntable is about λ/8 to λ/4.

* * * * *